United States Patent [19]
Jahn et al.

[11] Patent Number: 6,144,288
[45] Date of Patent: Nov. 7, 2000

[54] REMOTE WIRELESS SWITCH SENSING CIRCUIT USING RF TRANSCEIVER IN COMBINATION WITH A SAW CHIRP PROCESSOR

[75] Inventors: Ronald R. Jahn, Cedarburg; Ruth E. Hubbell, Milwaukee; David L. McClanahan, Cedarburry; Walter L. Rutchik, New Berlin; Gordon Barr Spellman, Mequon, all of Wis.

[73] Assignee: Eaton Corporation, Cleveland, Ohio

[21] Appl. No.: 08/828,377

[22] Filed: Mar. 28, 1997

[51] Int. Cl.$^7$ ....................................................... H04Q 1/00
[52] U.S. Cl. .................................... 340/10.33; 340/10.42; 340/10.34
[58] Field of Search .................... 340/825.54, 825.69, 340/825.72, 438, 446, 10.33, 10.34, 10.42; 73/514.28; 310/313 B, 313 D, 313 R; 333/195, 193, 151, 154, 150, 240; 307/106; 1/1

[56] References Cited

U.S. PATENT DOCUMENTS

| | | |
|---|---|---|
| 3,289,114 | 11/1966 | Rowen . |
| 3,479,572 | 11/1969 | Pokorny . |
| 3,648,081 | 3/1972 | Lean et al. ................................ 310/8.1 |
| 4,464,597 | 8/1984 | Setsune ................................ 310/313 B |
| 4,663,746 | 5/1987 | DeMaria et al. ......................... 367/119 |
| 4,931,664 | 6/1990 | Knoll ............................... 310/313 R X |
| 4,945,354 | 7/1990 | McColl ............................ 310/313 B X |
| 4,994,798 | 2/1991 | McColl ............................... 340/825.54 |
| 5,565,825 | 10/1996 | Tera et al. ............................... 333/195 |
| 5,568,001 | 10/1996 | Davenport ............................ 310/313 R |
| 5,568,002 | 10/1996 | Kawakatsu ........................... 310/313 B |
| 5,717,367 | 2/1998 | Murai ..................................... 333/195 |
| 5,838,091 | 11/1998 | Watanabe ........................ 310/313 B X |

OTHER PUBLICATIONS

James R. McColl and Joanne M. Browne, GTE Laboratories, Incorporated, William C. Knoll, GTE Products Corporation, Paper No. 90072 Entitled ▒ Simple, Passive, Non–Contact Class A Multiplexing Method Using Programmable Surface Acoustic Wave Devices▒. No month. No year.

Physical Sciences Directorate, Army Research Laboratory, Fort Monmouth, New Jersey, May 1996, ▒ Passive SAW ID Tag With Processing Gain for Extended Range▒.

*Primary Examiner*—Brian Zimmerman
*Attorney, Agent, or Firm*—Fay, Sharpe, Fagan, Minnich & McKee, LLP

[57] ABSTRACT

A circuit assembly senses a state of a variable state device, wherein a data signal representative of the state is communicated via wireless telegraphy. A surface acoustic wave (SAW) device, having a plurality of interdigital transducers (IDTs) comprises a wave launching IDT and a state information IDT, wherein the plurality of IDTs are in acoustical communication and the state information IDT is in electrical communication with an antenna through the variable state device. An RF transceiver communicates a trigger signal to the SAW device, wherein the trigger signal causes a launching of a SAW wave from the wave launching IDT towards the state information IDT. The state information IDT generates a signal pulse in response thereto and communicates the pulse to the antenna through the variable state device. A transceiver control module, in operative communication with the RF transceiver enables communication of the trigger signal and reads the data signal, wherein the trigger signal and data signal are communicated between the RF transceiver in the SAW device via wireless telegraphy.

9 Claims, 3 Drawing Sheets

REMOTE WIRELESS SWITCH SENSING CIRCUIT USING RF TRANSCEIVER IN COMBINATION WITH A SAW CHIRP PROCESSOR

BACKGROUND OF THE INVENTION

1. Field of the Invention

The subject invention pertains to the field of control circuits, and more particularly to a circuit for sensing the state of a variable state device such as a switch. The invention is particularly applicable to sensing the state of an operator controlled switch of the type that are typically located on a steering wheel of a vehicle, but is also applicable to any environment where hard wire signal communication is particularly undesirable due to structural restrictions or a particularly harsh environment.

2. Description of the Related Art

The continuous increase of convenience features in passenger cars makes the wiring harness and connecting problems thereto a more important issue in terms of safety, reliability, cost and complexity of management. If multiplexing of such communication signals provides a solution in some cases, the vulnerability of this solution in case of bus wiring breakage in areas where numerous functions play a safety role is of significant concern. Examples are safety related switches in the steering wheel/stalk area, or the window lifter switches which are located off doors and control the window motors through the bus. A wireless solution would reduce the risk of wiring breakage, and permit easy relocation by OEMs of switches that do not have a dedicated location (mirrors, seats, windows, etc.) and are remote from the actuators.

Communication of control signals from a steering wheel through the steering column of a vehicle control module has long been a matter of special concern due to the difficulties in maintaining dependable signal communication from a rotating wheel and due to the sever space constraints occurring as a result of the requirement of airbag deployment from the wheel. A detailed discussion of the various hardware techniques, as well as communication through a rotary transformer are disclosed in commonly-assigned U.S. Pat. No. 5,636,863. Ideally, all communication would occur through wireless transmission to avoid the problems of a wiring harness disposal in a rotating wheel, but the relatively electrically noisy environment of an automotive vehicle has generally presented too difficult a setting to provide acceptably reliable communication for control circuitry.

Surface Acoustic Wave (SAW) devices are well known as passive devices that are typically useful for providing an easily recognizable identification signal without need of active electrical power supply to the SAW device itself. The use of a signal communication device that is essentially passive in nature would be particularly advantageous in a steering column application, and such an assembly has already been suggested. However, such suggested applications have not been able to employ such a SAW device in combination with wireless signal communication. Specifically, coupling between a control module and a SAW device has required hard wired signal communication or coupling coils to accommodate relative rotation between the wheel and steering column. Thus, problems still remain in such a system of accommodating coil disposition in the steering column and the signal wires thereof running among operator actuated control switches, the SAW device and the coupling coil.

The present invention contemplates a new and improved wireless switch device and control assembly which overcome the problems of hard wire or coupling coil signal communication while including a SAW device for monitoring switch conditions to provide a new device and circuit assembly which is simple in design, economical to manufacture, readily adaptable to a plurality of uses for control communication or signal monitoring in a wide variety of applications and which provides improved ease of signal communication with high reliability and communication integrity.

BRIEF SUMMARY OF THE INVENTION

It is desirable to have the state of switches located in a car passenger compartment monitored by the automotive body computer without the use of communication wires to lower cost, weight, and increase reliability. The proposed invention accomplishes this task. It is very noise immune and operates without a power supply. Power is derived from a received RF signal which is chirped to provide noise reduction.

In accordance with the present invention, there is provided a circuit assembly for sensing a state of a variable state device representative of an operator actuated switch or a condition of the device wherein a data signal representative of the state is communicated via wireless telegraphy. The assembly comprises a Surface Acoustic Wave (SAW) device, an RF transceiver and a transceiver control module. The SAW device has a plurality of interdigital transducers (IDTs), comprising a wave launching IDT and a state information IDT, wherein the plurality of IDTs are in electrical communication with an antenna and the state information IDT is in electrical communication with the variable state device. The RF transceiver communicates a trigger signal to the device wherein the trigger signal causes a launching of the SAW wave from the wave launching IDT towards the state information IDT and the state information IDT generates a signal pulse in response thereto. The signal pulse is then communicated to the antenna through the variable state device which will modify the pulse to be representative of the state of the device. The transceiver control module is in operative communication with the RF transceiver and enables communication of the trigger signal and reads the data signal. The trigger signal and the data signal are communicated between the RF transceiver and the SAW device via wireless telegraphy.

In accordance with a more limited aspect of the present invention, the data signal comprises a waveform including a start pulse, a stop pulse and a state information pulse intermediate thereof, wherein an absence or existence of the state information pulse is representative of the state of the variable state device. The variable state device includes a circuit switch for determining the absence or existence of the pulse. More particularly, an open switch precludes communication of the pulse to the antenna.

In accordance with yet another more limited aspect of the present invention, a plurality of variable state devices are each respectively associated with a different state information IDT. The plurality are in parallel connection to the antenna so that the data signal comprises a wave form wherein a pulse occurring at a particular unique location in the waveform signifies a state of the variable state device.

One benefit obtained by the use of the present invention is a SAW signal device that can communicate via wireless telegraphy a data signal representative of a variable state device.

Another benefit obtained from the present invention is a wireless signal device that can be disposed in an electrically noisy environment such as a vehicle steering column.

A further benefit of the present invention is a passive wireless signal device which includes a circuit component capable of communicating switch contact information without application of active electronics, such as a power signal, to the component.

Other benefits and advantages for the subject new circuit assembly and device will become apparent to those skilled in the art upon a reading and understanding of this specification.

BRIEF DESCRIPTION OF THE DRAWINGS

The invention may take physical form in certain parts and arrangements of parts, the preferred embodiments of which will be described in detail in the specification and illustrated in the accompanying drawings which form a part hereof and wherein.

DETAILED DESCRIPTION OF THE INVENTION

The system works by receiving and changing a chirped RF interrogation signal and by processing this signal in a SAW device. The SAW device converts the RF into an acoustic surface wave. The acoustic wave is converted back to an electrical signal on the SAW device. This electrical signal is sent to a contact that would either be open or closed. If the contact were closed, the electrical signal would then be sent on to a broadcast system where an RF signal would be sent out (radiated). In this manner the state of the switch being closed could be monitored without power and wires at the switch.

Figure 1:
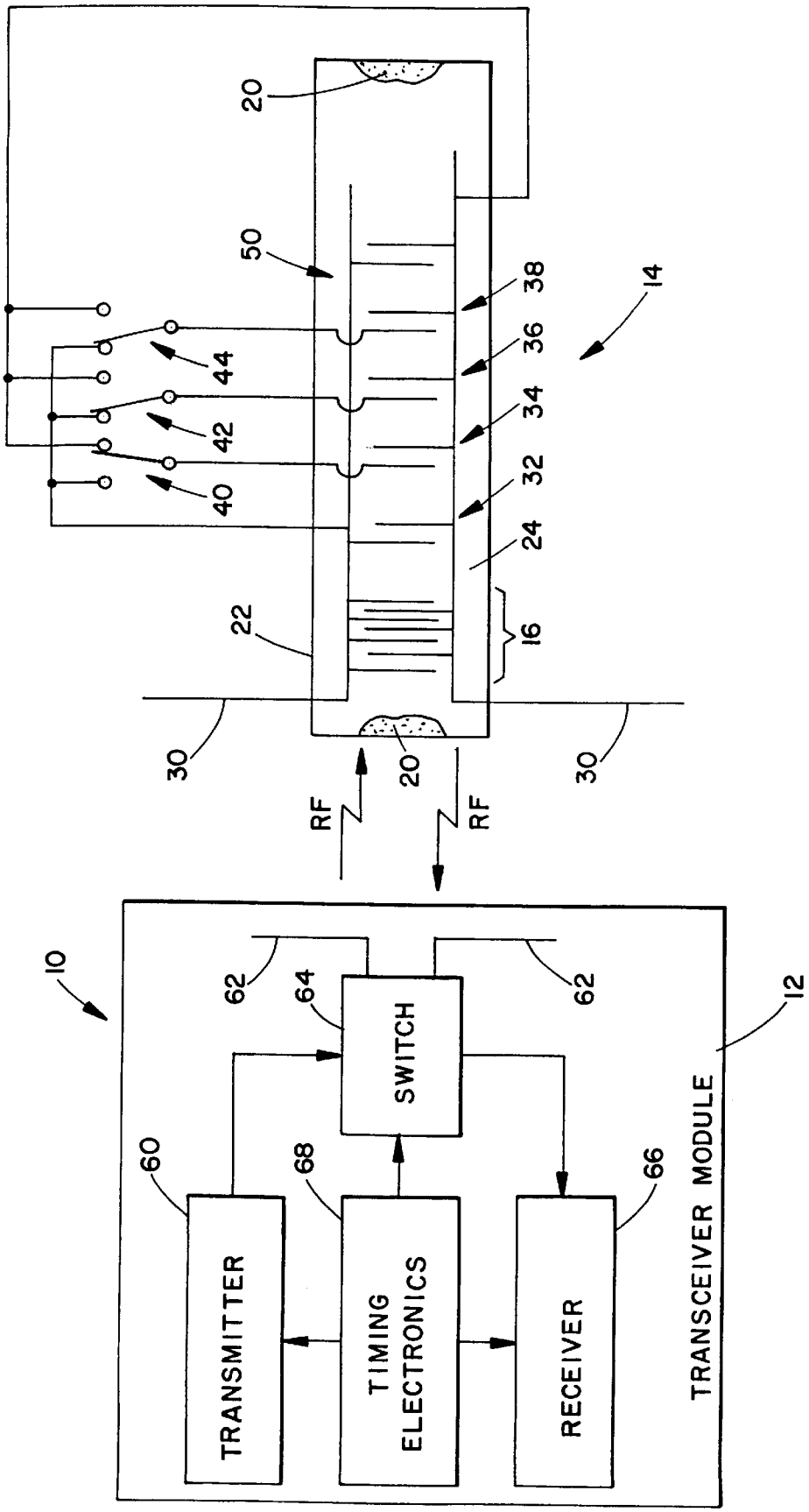
FIG. 1 is a block diagram of a switch detection system formed in accordance with the present invention.

The process of converting the switch open/closed output to a radiated RF signal could be realigned by direct connection of the switch as shown in FIG. 1 or could involve further processing with a SAW structure followed by a radiated RF signal to indicate the contact closure.

Figure 2:
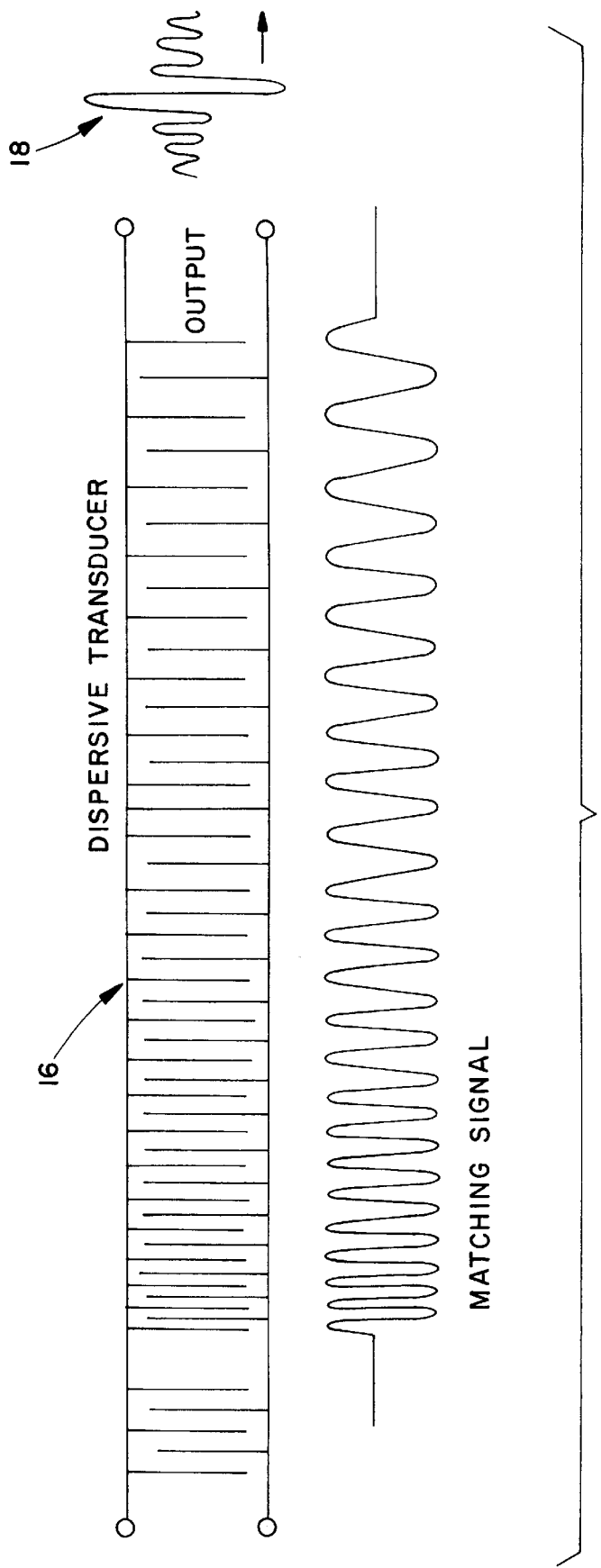
FIG. 2 is a representation of the dispersive transducer on the SAW device including the input signal to the dispersive transducer and the resulting acoustic output pulse.

Referring now to the drawings wherein the showings are for purposes of illustrating the preferred embodiments of the invention only, and not for purposes of limiting same, the FIGURES show a switch sensing circuit assembly comprising an RF transceiver in combination with a SAW chirp processor. With particular reference to FIG. 1, a preferred circuit assembly 10 is shown to comprise a transceiver module 12 and a SAW processor 14. The SAW processor itself is essentially conventional in nature and is comprised of a piezoelectric substrate, preferably of lithium niobate, upon which are disposed a plurality of interdigital transducers (IDTs). Towards one end of the SAW device 14 a set of IDTs comprise a SAW launching IDT assembly. Such assembly is more particularly illustrated in FIG. 2, wherein the plurality of IDTs are disposed to function as a pulse compression filter when a matching signal of the kind shown in FIG. 2 is impressed thereon. The result of the pulse compression filter 16 is an output pulse 18, comprising a wave moving across the piezoelectric towards the other IDTs for generating an electrical signal in each one of them. Such a configuration, typically referred to as a "delay line", will allow identification of pulses in a time domain which can correspond to particular IDTs, as will hereinafter be more fully explained. At opposed ends of the SAW device are absorption materials 20 to minimize reflection of the wave pulse 18. Along the longitudinal length of the device 14, first and second bus bars 22, 24 are disposed for communication of electrical signals between the IDTs and the receive and transmit antenna 30. The IDTs, other than those used for the pulse compression filter, fulfill specific roles in pulse generation in the time domain. The IDTs at position 32 are both connected to the bus bars 22, 24, respectively, for purposes of generating a recognizable start pulse. The IDTs at positions 34, 36 and 38 are connected to switches 40, 42, 44, respectively. The last IDT position 50 corresponds to IDTs which are similarly connected to both bus bars for generating a recognizable stop pulse. The IDTs at positions 34, 36, 38 are connected to bus bars 22, 24 through switches 40, 42, 44. However, any type of switch, or for that matter any variable state device, could be monitored by the subject invention.

The transceiver module 12 generates a trigger signal and receives a responsive waveform from the SAW device 14. In particular, transmitter 60 sends out an RF signal through transmit and receive antenna 62 of a type that will generate the matching signal in the SAW device, such as illustrated in FIG. 2. Switch 64 is used to isolate the receiver 66 when the transceiver module is in the transmit mode and, alternatively, to isolate the transmitter 60 when the module is in the receive mode. Timing electronics 68 control the state of switch 64 and the timing operations of the transmitter and receiver in a conventional manner which would be known to one of ordinary skill in the art. It is preferred that the RF signal be of relatively high frequency to reduce the size requirements of the antennas 30, 62.

A proof-of-concept prototype operated successfully at distances greater than six (6) feet at 75 MHz. However, SAW devices will operate at higher frequencies in the range of 900 MHz and offer the advantage of significant reduction in the size of the antenna required.

Figure 3A:
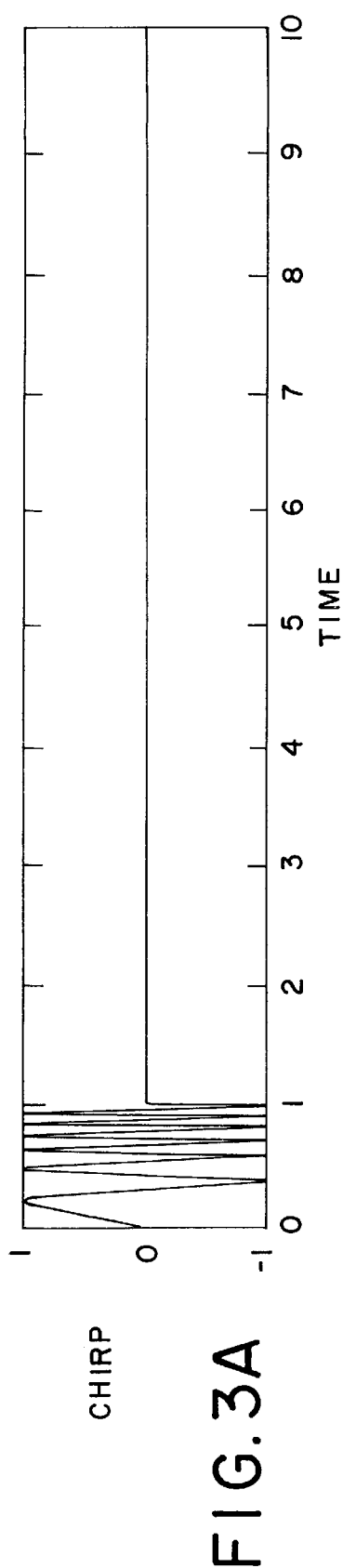
FIGS. 3A–3C are time scale illustrations of the input pulse and ID tag waveforms generated by the subject invention.
Figure 3B:
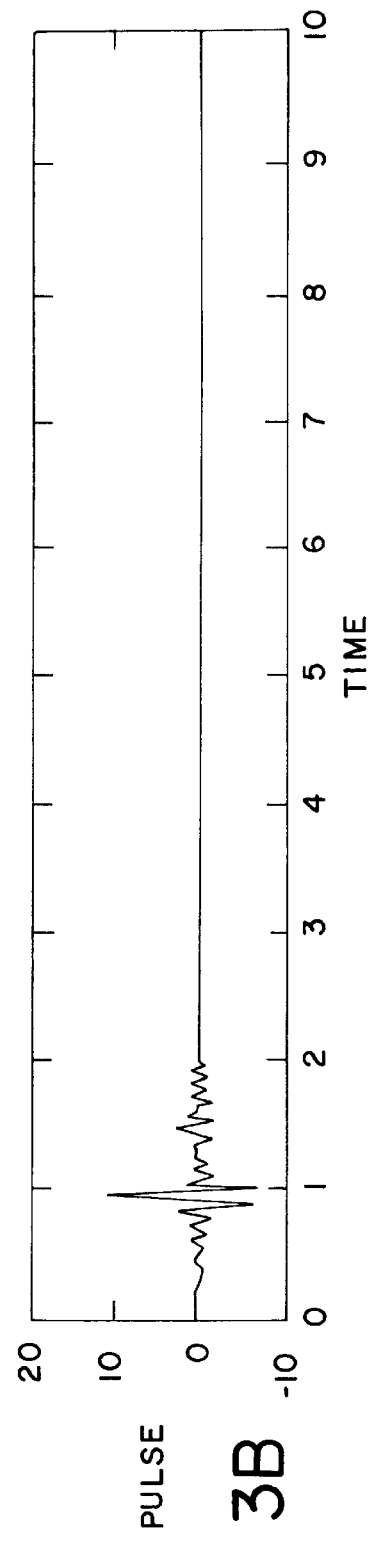
Figure 3C:
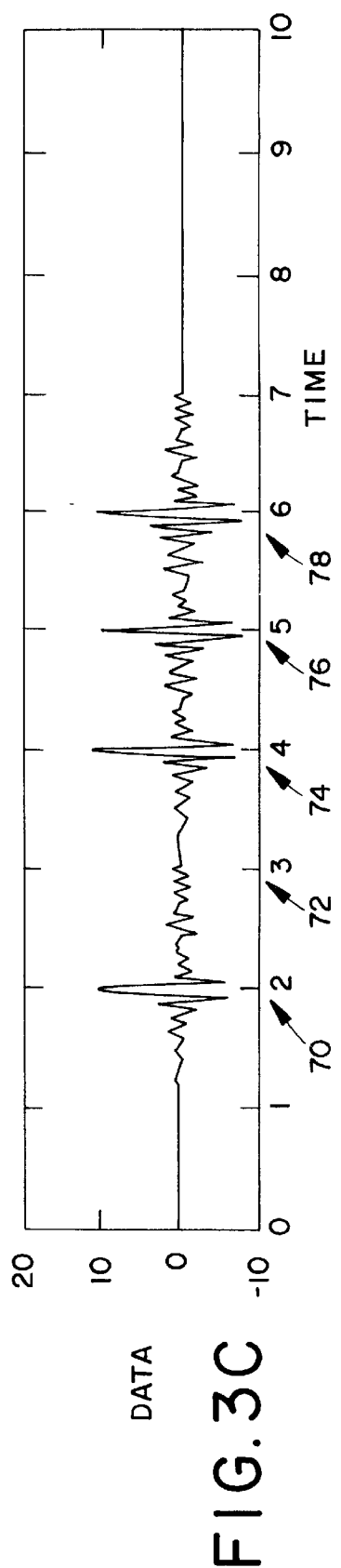

With particular reference to FIGS. 1 and 3, circuit operation will be explained. FIG. 3 illustrates s chirp signal comprising a high frequency RF signal transmitted from the transceiver module 12 and received by the SAW device 14. The IDTs of the pulse compression filter 16 convert the electromagnetic energy of the chirp signal into an acoustic waveform trigger signal, such as illustrated in FIG. 3B. A data signal representative of the state of the switches 40, 42, 44 is illustrated in FIG. 3C. Deflection of the piezoelectric substrate by the acoustic wave of FIG. 3B will generate an electrical signal which can be communicated back out from the SAW device 14 via antennas 30. In particular, as the acoustic pulse contacts the IDTs at position 32, a start pulse 70 can be recognized by the receiver 66 in the receiver module 12. At position 72, no pulse is detected which indicates that the switch 40, corresponding to IDT position 34 is open so that electrical energy detected by the IDTs at position 34 cannot be communicated back to the antenna 30. At position 74, a pulse is recognized indicating that the switch 42 is closed to thereby communicate the electrical energy sensed by the IDTs at position 36 back out by the antennas 30. Similarly, switch 44 is detected as being closed by the occurrence of the pulse at position 76 in FIG. 3C. Lastly, the pulse in the data signal at position 78 is representative of the stop pulse in the data signal. Thus, control circuitry which identifies an existence or absence of a pulse at the respective positions shown in FIG. 3C, can be used to identify the particular state of variable state devices such as the switches shown in FIG. 1.

It is a particular feature of the invention that the RF trigger signal, as well as the data pulse signal are communicated between the transceiver module 12 and the SAW device 14 via wireless telegraphy. Such an assembly is particularly applicable to monitoring operator control switches such as are typically disposed on a vehicle steering wheel. Such switches relate to items such as cruise control, horn, turn signals and the like.

Various alternative modes are known for implementing the circuit of the SAW device 14. For example, even though both bus bars are shown being disposed on the piezoelectric substrate, it is possible to remove one of the bus bars from the piezoelectric material itself and dispose it elsewhere. It is only important that the data signal be somehow communicated back to the antennas 30 for reception by the transceiver module 12.

It is most convenient when the variable state device being sensed by the subject invention is disposed serially between the state information IDTs at positions 34, 36, 38 so that when the variable state device comprises a switch, and when the switch is in an open state, the transmission of the data signal from the particularly associated state information IDT to the antenna is precluded. However, alternative circuit arrangements may also occur to those of ordinary skill in the art to accommodate other types of variable state devices.

The invention has been described with reference to preferred embodiments. Obviously modifications and alterations will occur to others upon the reading and understanding of this specification. It is our intention to include all such modifications and alternations insofar as they come within the scope of the appended claims or the equivalents thereof.

Having thus described our invention, we now claim:

1. A circuit assembly for sensing a state of a variable state device wherein a data signal representative of the state is communicated via wireless telegraphy comprising:

a surface acoustic wave (SAW) device having a plurality of interdigital transducers (IDTs) comprising a wave launching IDT and a state information IDT wherein the plurality of IDTs are in acoustical communication and the state information IDT is in selective electrical communication with an antenna by the variable state device, the variable state device being disposed to selectively interrupt the electrical communication between the state information IDT and the antenna;

an RF transceiver for communicating a trigger signal to the SAW device wherein the trigger signal causes a launching of a SAW wave from the wave launching IDT towards the state information IDT and the state information IDT generates an electrical signal pulse in response thereto, said electrical signal pulse being selectively communicated to the antenna through said variable state device; and, a transceiver control module in operative communication with the RF transceiver for enabling communication of the trigger signal and for reading the data signal comprising an absence or presence of the signal pulse wherein the trigger signal and the data signal are communicated between the RF transceiver and the SAW device via wireless telegraphy.

2. The circuit assembly as defined in claim 1 wherein the variable state device comprises an operator controlled switch disposed on a vehicle steering wheel.

3. The circuit assembly as defined in claim 1 wherein the data signal comprises a waveform including a start pulse and a stop pulse, a state information pulse intermediate thereof wherein the absence or presence of the state information pulse is representative of the state of the variable state device.

4. The circuit assembly as defined in claim 3 wherein said variable state device includes means for determining said absence or presence.

5. The circuit assembly as defined in claim 1 wherein the variable state device is disposed serially between the state information IDT and the antenna.

6. The circuit assembly as defined in claim 5 wherein the variable state device comprises a switch which in an open state precludes transmission of the signal pulse from the state information IDT to the antenna.

7. The circuit assembly as defined in claim 6 wherein a plurality of state information IDTs are disposed on said SAW device, each of said plurality being respectively associated with a one of a plurality of distinct variable state devices.

8. The circuit assembly as defined in claim 7 wherein said plurality of variable state devices are in parallel communication to the antenna.

9. The circuit assembly as defined in claim 8 wherein said plurality of state information IDTs are disposed to generate the data signal as a pulse train comprised of a plurality of pulse signals, the respective absence or presence of the pulse signal at a predetermined position in the pulse train being representative of a state of the associated one of the variable state devices.

* * * * *